United States Patent Office

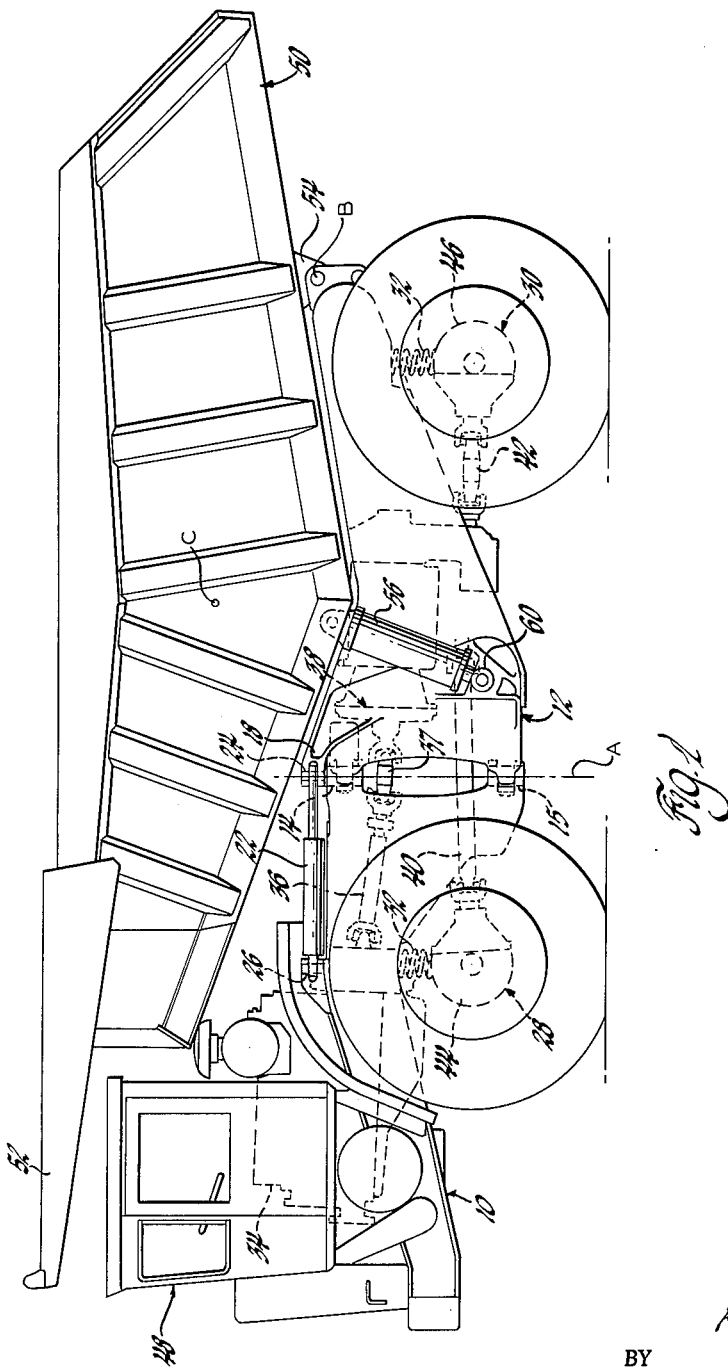

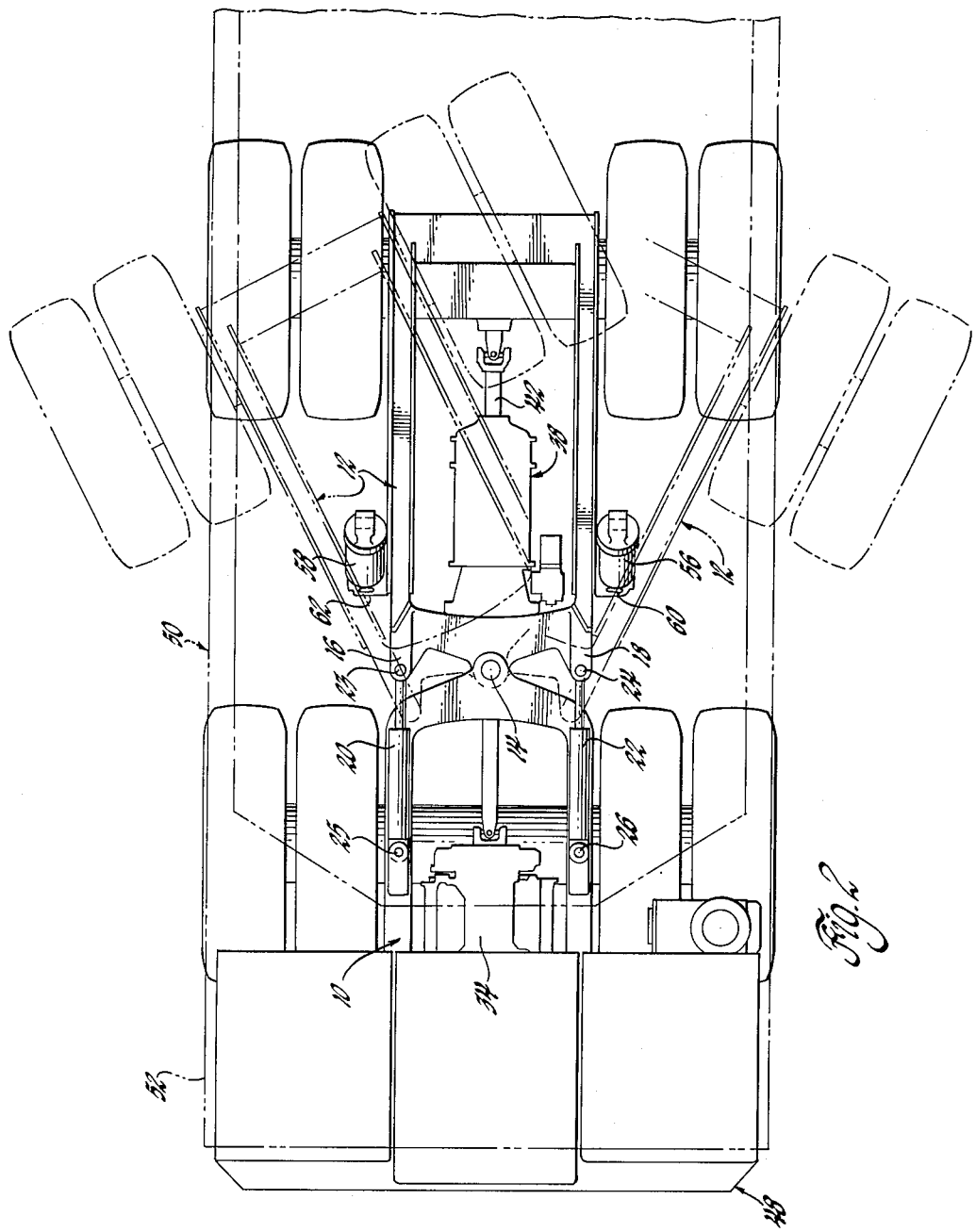

3,211,498
Patented Oct. 12, 1965

3,211,498
ARTICULATED REAR DUMP VEHICLE
Henry A. Peller, Cleveland, Ohio, assignor to General Motors Corporation, Detroit, Mich., a corporation of Delaware
Filed May 16, 1963, Ser. No. 280,928
4 Claims. (Cl. 298—22)

This invention pertains to an off-the-highway vehicle of the dump-type in which a load-retaining body is pivotally supported by the vehicle frame and located substantially between the front and rear axles and includes power-actuated means for raising the body rearwardly to dump a load.

The conventional four-wheel drive rear-dump vehicle comprises a single frame member, the forward portion of which supports one or more engines that through suitable power-transmitting means provide drive to the front and rear wheels of the vehicle. Typically, an operator's cab is located immediately behind the engine while the load-retaining body is supported by the intermediate and rear portion of the frame member.

The present invention contemplates an improved rear-dump vehicle of the above-described type characterized by having separate front and rear frame sections pivotally interconnected about a vertical axis for relative frame articulation. An engine is supported by the front frame section and directs drive through appropriate means to the front and rear wheels which are connected through suspension means to the associated frame section. A load-retaining body is pivotally connected to the rear frame section and is supported by the respective frames in a position which permits the center of gravity of the body, when in the carry-position, to be located between the axes of rotation of the front and rear wheels.

A more complete understanding of this invention will be derived from the following detailed description when taken in conjunction with the drawings in which:

FIGURE 1 is an elevation view of a rear-dump vehicle constructed in accordance with the invention, and FIGURE 2 is a plan view of the vehicle of FIGURE 1 illustrating the relative positions of the front and rear frame sections during steering.

Referring now to the drawings, a vehicle constructed in accordance with the invention is shown comprising a front frame section 10 and a rear frame section 12 having the inner ends thereof terminating with vertically spaced hinge portions interconnected by pins 14 and 15 so as to define a vertical pivot axis A. As seen in FIGURE 2, the inner end of the rear frame section also includes axially extending laterally spaced arms 16 and 18 that are located on opposite sides of the pivot axis A. The respective arms pivotally support the rod ends of a pair of double-acting hydraulic jacks 20 and 22 at points 23 and 24 while the opposite ends of the respective jacks are pivotally connected at points 25 and 26 to the front frame section. Thus, upon supplying pressurized fluid to the jacks, one of the latter extends while the other contracts to accomplish relative steering movement about the aforementioned axis A as shown in FIG. 2. A fluid system of a type that can be employed for actuating the steering jacks can be seen in the patent to Bernotas 2,981,356, assigned to the assignee of this invention.

The front and rear frame sections are respectively connected with transverse axles 28 and 30 each of which rotatably supports a pair of rubber-tired wheels at the opposite ends thereof. In the preferred form, each axle is suspended from the associated frame section by a suspension system which includes coil spring means such as that indicated by the numeral 32 and appropriate support members (not shown) that permit the axle to oscillate as a unit about an axis extending longitudinally of the associated frame section. Moreover, although single axles are provided at each frame section, an independent wheel suspension system could be used in lieu of single axles, the important consideration being that some form of resilient support exists between the wheels and vehicle for absorbing the energy as the wheels move relative to the frame sections during vehicle travel. A detailed illustration of a suspension system and the various components thereof are not disclosed inasmuch as this is a technology well known to those skilled in the art and therefore not deemed necessary for purposes of understanding the invention.

An engine 34 is mounted on the front frame section at the longitudinal center thereof and is connected through a drive shaft 36 and stub shaft 37 with the transmission 38 centrally supported by the rear frame section. The engine is disposed forward of the axis of rotation of the front wheels, this being found to be desirable for purposes of equalizing the load on all of the wheels.

Power transmitting means in the form of additional drive shafts 40, 42 are provided and connect the transmission with the differential housings 44 and 46 of the front and rear axles respectively. Accordingly, four-wheel drive is realized which permits all wheels to provide tractive power for propelling the vehicle. An operator's compartment 48 is provided on the front frame section adjacent the engine so as to position the operator in a cantilever manner forward of the front wheels and in a position which provides the best visibility from a safety standpoint.

The load-retaining body 50, as seen in the embodiment of FIG. 1, is designed for accommodating large rock, ore, shale and similar materials or a combination of free-flowing and bulky loads. The body 50 is of a length greater than the distance between the front and rear axles and includes a cab guard 52 fixed to the forward portion of the body. When in the carry position, the body is located substantially mid-way between the axles 28 and 30, and is supported by both frame sections so that the load on the wheels is substantially uniform. A pair of laterally-spaced extensions, one of which is indicated by the numeral 54, are secured to the underside of the body adjacent the rear end of the latter and serve to connect the body to the rear frame section for pivotal movement about a transverse axis B. In addition, a pair of hydraulic jacks 56 and 58 have one end thereof respectively pivotally mounted to support brackets 60 and 62 located outboard of the rear frame section's side rails, as seen in FIG. 2. The opposite ends of the respective jacks are pivotally connected to the underside of the load-retaining body at substantially the mid point of the latter. As should be apparent, expansion of these jacks raises the forward end of the load-retaining body upwardly and rearwardly about the pivot axis B in dumping a load.

It should be noted that the center of gravity of the load-retaining body in the carry position of FIG. 1 is approximately at a point C which is located substantially mid-way between the front and rear axles. Thus, as alluded to above, substantially equal load distribution on all of the driving wheels is provided resulting in the tractive power of the front and rear wheels being substantially uniform to permit the vehicle to operate most effectively under adverse operating conditions such as steep grades, soft fills or deep sand.

Various changes and modifications can be made in the above-described vehicle without departing from the spirit of the invention. Such changes and modifications are contemplated by the inventor and therefore it should be understood that he does not wish to be limited except by the scope of the appended claims.

What is claimed is:

1. A rear dump vehicle comprising a front frame section, a rear frame section, each of said frame sections having a transverse axle supporting ground-engaging wheels, resilient suspension means interposed between each axle and the associated frame, means interconnecting said front and rear frame section about a vertical pivot axis located between the axles of the respective frame sections, fluid-operated means connected between said frame sections for moving the latter relative to each other about said vertical axis, an engine mounted on the front frame section forward of the front axle, an operator's cab carried by the front frame section and being positioned along one side of the engine, a transmission mounted on the rear frame section, a drive shaft connected between the engine and transmission, power-transmitting means connecting the transmission with the wheels of the front and rear frame sections for driving said wheels, a load-retaining body pivotally mounted to the rear frame section at a point aft of the axle associated with the rear frame section, said load-retaining body having an over-all length at least equal to the distance between the front and rear axles and being so located in the carry position that the front end of said body is adjacent the operator's cab and the center of gravity of said body is located substantially midway between said axles, a pair of hydraulic jacks pivotally connected at one end to the rear frame section outboard of the latter, and the opposite end of said jacks pivotally connected to the load-retaining body substantially mid-way between the front and rear end thereof for raising the body rearwardly about its pivot connection to dump a load.

2. A rear dump vehicle comprising a front frame section, a rear frame section, each of said frame sections having a transverse axle supporting ground-engaging wheels, resilient suspension means interposed between each axle and the associated frame section for supporting the axle for oscillation about an axis extending longitudinally of the vehicle, means interconnecting said front and rear frame sections about a vertical pivot axis located between the axles of the respective frame sections, fluid-operated means connected between said frame sections for moving the latter relative to each other about said vertical axis, an engine mounted on the front frame section, an operator's cab carried by the front frame section forward of the front axle, a transmission mounted on the rear frame section, a drive shaft connected between the engine and transmission, power-transmitting means connecting the transmission with the wheels of the front and rear frame sections for driving the wheels, a load-retaining body pivotally mounted to the rear frame section at a point aft of the axle associated with the rear frame section, said load-retaining body having an over-all length at least equal to the distance between the front and rear axles and being so located in the carry position that the front end of said body is adjacent the operator's cab and the center of gravity of said body is located substantially midway between said axles, and at least one hydraulic jack pivotally connected at one end to the rear frame section, and the opposite end of said jack pivotally connected to the load-retaining body for raising the forward portion of the latter rearwardly and upwardly about the body pivot connection to dump a load.

3. A rear dump vehicle comprising a front frame section, a rear frame section, each of said frame sections being of substantially equal length and having a transverse axle supporting ground-engaging wheels, the inner ends of each of said frame sections terminating with vertically spaced hinge points, means interconnecting said hinge points of the front and rear frame sections so as to define a vertical pivot axis located between the axles of the respective frame sections, resilient suspension means interposed between each axle and the associated frame, fluid-operated means connected between said frame sections for moving the latter relative to each other about said vertical axis, an engine mounted on the front frame section forward to the front axle, an operator's cab carried by the front frame section and being positioned along one side of the engine, a transmission mounted on the rear frame section, a drive shaft connected between the engine and transmission, power-transmitting means connecting the transmission with the wheels of the front and rear frame sections for driving the wheels, a load-retaining body pivotally mounted to the rear frame section at a point aft of the axle associated with the rear frame section, said load-retaining body having an over-all length at least equal to the distance between the front and rear axles and being so located in the carry position that the front end of said body is adjacent the operator's cab and the center of gravity of said body when loaded is located substantially midway between said axles, a pair of hydraulic jacks pivotally connected at one end to the rear frame section outboard of the latter, and the opposite end of said jacks pivotally connected to the load-retaining body for raising the latter rearwardly about its pivot connection to a dump load.

4. The vehicle defined by claim 3 wherein said pair of vertically spaced hinge points are so located that the drive line connecting the engine with the transmission passes between said hinge points.

References Cited by the Examiner

UNITED STATES PATENTS

| | | | |
|---|---|---|---|
| 1,957,917 | 5/34 | Storey | 180—51 X |
| 2,347,882 | 5/44 | Choate | 180—51 X |
| 2,557,082 | 6/51 | Double | 298—17 |
| 2,762,650 | 9/56 | Hutchinson | 298—22 |
| 3,007,590 | 11/61 | Mathew | 180—51 X |
| 3,049,186 | 8/62 | Garrett | 180—51 |
| 3,063,511 | 11/62 | Malmgren | 180—12 |
| 3,159,229 | 12/64 | Thwaites | 180—51 |

FOREIGN PATENTS 791,840   3/58   Great Britain.

ARTHUR L. LA POINT, *Primary Examiner.*

RALPH D. BLAKESLEE, MILTON BUCHLER,
*Examiners.*